US012691722B2

(12) United States Patent
Zheng et al.

(10) Patent No.: US 12,691,722 B2
(45) Date of Patent: Jul. 28, 2026

(54) BATTERY TEMPERATURE REGULATION DEVICE

(71) Applicant: HONDA MOTOR CO., LTD., Tokyo (JP)

(72) Inventors: Anxin Zheng, Tokyo (JP); Takeshi Ueda, Tokyo (JP); Daijiro Yoshinari, Tokyo (JP); Kota Sakuma, Tokyo (JP)

(73) Assignee: HONDA MOTOR CO., LTD, Tokyo (JP)

( * ) Notice: Subject to any disclaimer, the term of this patent is extended or adjusted under 35 U.S.C. 154(b) by 155 days.

(21) Appl. No.: 18/585,080

(22) Filed: Feb. 23, 2024

(65) Prior Publication Data

US 2024/0326545 A1      Oct. 3, 2024

(30) Foreign Application Priority Data

Mar. 31, 2023      (JP) ................................. 2023-058718

(51) Int. Cl.
B60H 1/00          (2006.01)
H01M 10/613          (2014.01)
          (Continued)

(52) U.S. Cl.
CPC ...... B60H 1/00278 (2013.01); H01M 10/613 (2015.04); H01M 10/625 (2015.04);
          (Continued)

(58) Field of Classification Search
CPC .. H01M 10/63; H01M 10/625; H01M 10/613; H01M 10/615; H01M 10/6567;
          (Continued)

(56) References Cited

U.S. PATENT DOCUMENTS 10,259,286 B2 *    4/2019   Janier ................ B60H 1/00921
2009/0280395 A1 *   11/2009   Nemesh .............. H01M 10/615
                                                          429/62

(Continued)

FOREIGN PATENT DOCUMENTS

JP          2019047555 A      3/2019
WO      WO-2020110509 A1 *   6/2020   ........ H01M 10/6569

OTHER PUBLICATIONS

Pdf is translation of foreign reference WO-2020110509-A1 (Year: 2020).*

*Primary Examiner* — Paul Alvare
*Assistant Examiner* — Kamran Tavakoldavani
(74) *Attorney, Agent, or Firm* — CKC & PARTNERS CO., LLC

(57)          ABSTRACT

A battery temperature regulation device includes: fill port provided in a circuit in which coolant circulates; a pump; a plurality of heat exchangers; a solenoid valve arranged in a branching path of the circuit and switching the flow path; a controller controlling switching of the flow path; a heat exchange circuit performing heat exchange with the battery; a first circuit; and a second circuit, the fill port is arranged in either of the first and second circuit, and when filling coolant from the fill port, by performing open/close control of the solenoid valve after operation of the pump, and switching the circuit to the fill port arrangement circuit in which the fill port is arranged, air remaining in the circuit is discharged from the fill port.

4 Claims, 3 Drawing Sheets

(51) Int. Cl.
    *H01M 10/625*     (2014.01)
    *H01M 10/63*     (2014.01)
    *H01M 10/6568*     (2014.01)

(52) U.S. Cl.
    CPC ....... *H01M 10/63* (2015.04); *H01M 10/6568*
        (2015.04); *H01M 2220/20* (2013.01); *Y02E*
        *60/10* (2013.01)

(58) Field of Classification Search
    CPC .......... H01M 10/6568; H01M 2220/20; B60H
        1/00278; B60L 58/26; B60L 58/27; F25B
        2600/01; F25B 2600/23
    See application file for complete search history.

(56)             References Cited

U.S. PATENT DOCUMENTS

| | | | |
|---|---|---|---|
| 2020/0031191 A1* | 1/2020 | Oh | B60H 1/00899 |
| 2023/0246212 A1* | 8/2023 | Iwai | H01M 8/04097 |
| | | | 429/410 |
| 2024/0343086 A1* | 10/2024 | Maruyama | B60H 1/22 |

\* cited by examiner

LIQUID-GAS RATIO

TIME

BATTERY TEMPERATURE REGULATION DEVICE

This application is based on and claims the benefit of priority from Japanese application No. 2023-058718 filed on Mar. 31, 2023, the content of which is incorporated herein by reference.

BACKGROUND OF THE INVENTION

Field of the Invention

The present invention relates to a battery temperature regulation device.

Related Art

Conventionally, it has been known to configure a temperature regulation device for a battery equipped to a vehicle, so that coolant flows through a circuit provided to the battery and a heat exchanger, and the flow path of coolant is controlled by switching a solenoid valve (refer to Patent Document 1).

In the maintenance, etc. of a vehicle, in the case of replacing the coolant, if performing water filling without using a vacuum coolant filler, air is introduced to the circuit. The air is discharged from a coolant injection port provided to the circuit. However, in the case of there being a plurality of heat exchangers, etc. and the circuit branching, portions where air could not be released may occur according to the position of the coolant injection port. For this reason, the arrangement of the coolant injection port has been limited to positions capable of releasing air.

Patent Document 1: Japanese Unexamined Patent Application, Publication No. 2019-47555

SUMMARY OF THE INVENTION

A battery temperature regulation device which tends to release air easily upon replacing coolant has been demanded.

A battery temperature regulation device (for example, the battery temperature regulation device 1) for regulating the temperature of a battery by way of coolant according to a first aspect of the present disclosure includes: a fill port (for example, the fill port 3) provided in a circuit (for example, the circuit 2) in which coolant circulates, and to which the coolant is filled; a pump (for example, the pump 4) for circulating the coolant; a plurality of heat exchangers (for example, the first heat exchanger 5, second heat exchanger 6) which exchange heat with the coolant; a solenoid valve (for example, the solenoid valve 7) disposed at a branching path of the circuit and switching a flow path through which the coolant flows; a controller (for example, the controller 8) which controls switching of the flow path by the solenoid valve; a heat exchange circuit (for example, the common circuit 20) which performs heat exchange with the battery; a first circuit (for example, the first circuit 21) disposed switchably from the heat exchange circuit by the solenoid valve, and in which a first heat exchanger (for example, the first heat exchanger 5) is provided; and a second circuit (for example, the second circuit 22) disposed switchably from the heat exchange circuit by the solenoid valve, and in which a second heat exchanger (for example, the second heat exchanger 6) is provided, in which the fill port is disposed in either of the first circuit and the second circuit, and, in a case of filling coolant from the fill port, open/close control of the solenoid valve is performed after operation of the pump, and by switching the circuit circulating coolant to a fill port arrangement circuit (for example, the fill port arrangement circuit 210) in which the fill port is arranged among either of the first circuit and the second circuit, air remaining in the circuit is discharged from the fill port.

According to a second aspect of the present disclosure, in the battery temperature regulation device as described in the first aspect, it is preferable for the coolant to circulate from the fill port arrangement circuit through the heat exchange circuit to flow through the fill port arrangement circuit.

According to a third aspect of the present disclosure, in the battery temperature regulation device as described in the first or second aspect, it is preferable for the open/close control to include opening a fill port non-arrangement circuit (for example, the fill port non-arrangement circuit 220) in which the fill port is not arranged among either of the first circuit and the second circuit, after coolant has flowed from the fill port arrangement circuit to the heat exchange circuit, and switching the flow path of coolant to the fill port arrangement circuit after coolant passes through the fill port non-arrangement circuit to discharge air from the fill port arrangement circuit.

According to a fourth aspect of the present disclosure, in the battery temperature regulation device as described in the third aspect, it is preferable for the open/close control to be performed so as to open the solenoid valve after a solenoid valve closing time (for example, the solenoid valve first closing time t0, solenoid valve second closing time t2) elapses, and the solenoid valve closing time to be established as at least a value obtained by dividing a value arrived at by adding a water amount of coolant filled in the heat exchange circuit and a water amount of coolant filled in the fill port arrangement circuit by a flow rate in a state closing the solenoid valve.

According to a fifth aspect of the present disclosure, in the battery temperature regulation device as described in the fourth aspect, it is preferable for the open/close control to be performed so as to open the solenoid valve for a predetermined time (for example, the predetermined time t1) after the solenoid valve closing time has elapsed, a lower limit for the predetermined time to be established as a value obtained by dividing a water amount of coolant filled in the fill port arrangement circuit by a flow rate in a state opening the solenoid valve, and an upper limit for the predetermined time to be established as a value obtained by dividing a water amount of coolant filled in the heat exchange circuit by a flow rate in a state opening the solenoid valve.

According to the above first aspect, by performing open/close control of the solenoid valve to switch the circuit to the fill port arrangement circuit, it is possible to guide the air remaining in the circuit to the circuit having the fill port. Consequently, air tends to escape during filling of coolant. The degrees of freedom in layout of the fill port thereby broadens, and it is possible to design the circuit to be compact, as well as becoming possible to make the temperature regulation device of the battery compact. Furthermore, water filling even without a vacuum filler becomes possible during filling of coolant, and thus the burden on the user is reduced.

According to the above second aspect, air in the fill port arrangement circuit in which the fill port is arranged is reliably discharged.

According to the above third aspect, the air remaining in the fill port non-arrangement circuit in which the fill port is not arranged also flows through the fill port arrangement circuit by circulating in the circuit, and is discharged from the fill port. Since it becomes possible to discharge air wherever the fill port is arranged, the degree of freedom in layout of the fill port broadened, and it is possible to compactly design the circuit. In addition, it becomes possible to make the battery temperature regulation device compact. Furthermore, it becomes possible to fill water even without a vacuum filler during filling of coolant, and thus the burden on the user is reduced.

According to the above fourth aspect, it is possible to set the solenoid valve closing time as a lower limit for the time of the water flowing in the common circuit and fill port arrangement circuit to the fill port, and the air in the fill port arrangement circuit running to the fill port and discharging. Consequently, it becomes possible to more accurately and efficiently perform discharge of air.

According to the above fifth aspect, it is possible to set the time required to discharge air remaining in the fill port non-arrangement circuit to the common circuit as the lower limit for the predetermined time, and set the time so that the air discharged from the fill port non-arrangement circuit does not enter the fill port non-arrangement circuit again as the upper limit for the predetermined time. Consequently, it becomes possible to more accurately and efficiently perform discharge of air.

DETAILED DESCRIPTION OF THE INVENTION

Figure 1:
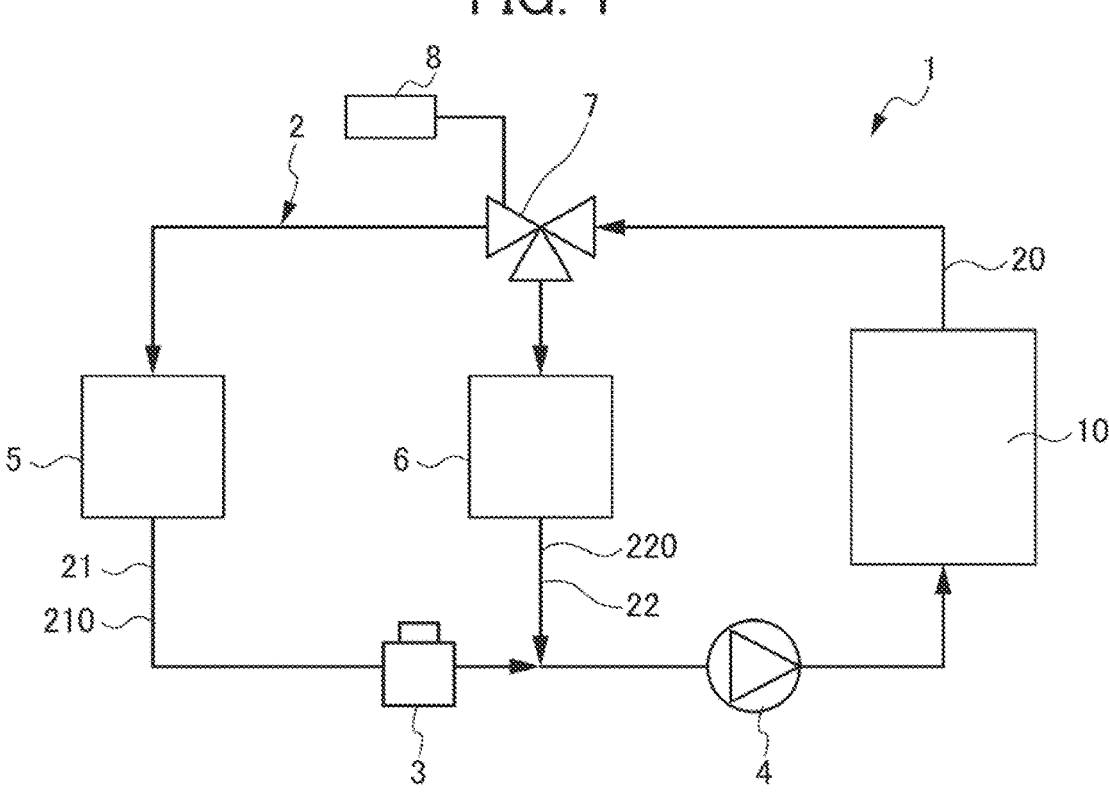
FIG. 1 is a view showing a battery temperature regulation device according to the present embodiment.

Hereinafter, a first embodiment of the present invention will be explained in detail while referencing the drawings. The battery temperature regulation device 1 regulates the temperature of a battery 10 equipped to a vehicle such as an electric vehicle by way of coolant. As shown in FIG. 1, the battery temperature regulation device 1 is configured to include a circuit 2 through which coolant flows at the periphery of the battery 10, and has the battery 10, circuit 2, coolant injection port 3, pump 4, plurality of heat exchangers (first heat exchanger 5, second heat exchanger 6), solenoid valve 7, and controller 8.

The battery 10 supplies electric power to a motor (not shown) driving the vehicle. The battery 10 is configured by a plurality of cells being coupled, and is arranged in the vehicle.

The first heat exchanger 5 is a heat exchanger for cooling which cools the battery 10 by exchanging heat with coolant, and may be a radiator, chiller or the like.

The second heat exchanger 6 is a heat exchanger for heating which exchanges heat with the coolant to heat the coolant as necessary, and may be a heater.

The pump 4 is a water pump provided to the circuit 2 described later, and sends out the coolant in the direction of the arrow shown in FIG. 1. The pump 4 is arranged upstream of the battery 10 in the circuit 2, and circulates the coolant. It should be noted that the coolant is a liquid which hardly freezes called a so-called long-life coolant (LLC).

The solenoid valve 7 is arranged at the branch path of the circuit 2, and switches the flow path in which the coolant flows. As shown in FIG. 1, in the present embodiment, a three-way valve is used.

The controller 8 is connected to the solenoid valve 7, and is a central processing unit which controls switching of the flow path depending on whether or not energizing the solenoid valve 7. In a case in which the controller 8 is not energizing the solenoid valve 7, the coolant flows in the first circuit 21. When the controller 8 energizes the solenoid valve 7 to turn ON, the coolant flows in the second circuit 22.

The circuit 2 includes a common circuit 20, first circuit 21 and second circuit 22 as a heat exchange circuit. The circuit 2 is configured by pipe configured with high heat transfer property material such as metal, and is provided around the battery 10 so that coolant circulates.

The common circuit 20 is arranged so as to pass around the battery 10, and carry out heat exchange with the battery 10. The common circuit 20 is connected to both the first circuit 21 and second circuit 22 explained below, and both the cooling passing through the first heat exchanger 5 and coolant passing through the second heat exchanger 6 come to circulate in common.

The first circuit 21 is the circuit 2 for cooling in which the first heat exchanger 5 is provided, and the coolant flows. The first circuit 21 has an upstream side connected to the solenoid valve 7 arranged on the downstream side of the common circuit 20, and a downstream side connected to the common circuit 20. The first circuit 21 is arranged to be switchable from the common circuit 20 by the solenoid valve 7, and when the solenoid valve 7 is OFF, the coolant flows therethrough.

The second circuit 22 is a circuit 2 for heating in which the second heat exchanger 6 is provided, and the coolant is heated and flows therethrough. The second circuit 22 has an upstream side connected to the solenoid valve 7 arranged on the downstream side of the common circuit 20, and branches away from the first circuit 21, and the downstream side connected to the common circuit 20. The second circuit 22 is arranged to be switchable from the common circuit 20 by the solenoid valve 7, and when the solenoid valve 7 is ON, the coolant flows therethrough.

The coolant fill port 3 is arranged in the first circuit 21, and is an opening which is closeable for discharging the coolant in the circuit 2, and recharging new coolant. The fill port 3, when the vehicle or battery temperature regulation device 1 are broken or the like, it opened and closed for exchanging the coolant. The fill port 3 is configured so that gas-liquid separation is carried out so that coolant accumulates below and air above, and the air above is discharged.

Next, the sequence of discharging air remaining in the circuit 2 will be explained in the above-mentioned battery temperature regulation device 1 in the case of filling coolant from the fill port 3 for performing exchange of coolant. In the present embodiment, the first circuit 21 in which the fill port 3 is arranged is called a fill port arrangement circuit 210, and the second circuit 22 in which the fill port 3 is not arranged is called a fill port-non-arrangement circuit 220.

Figure 2:
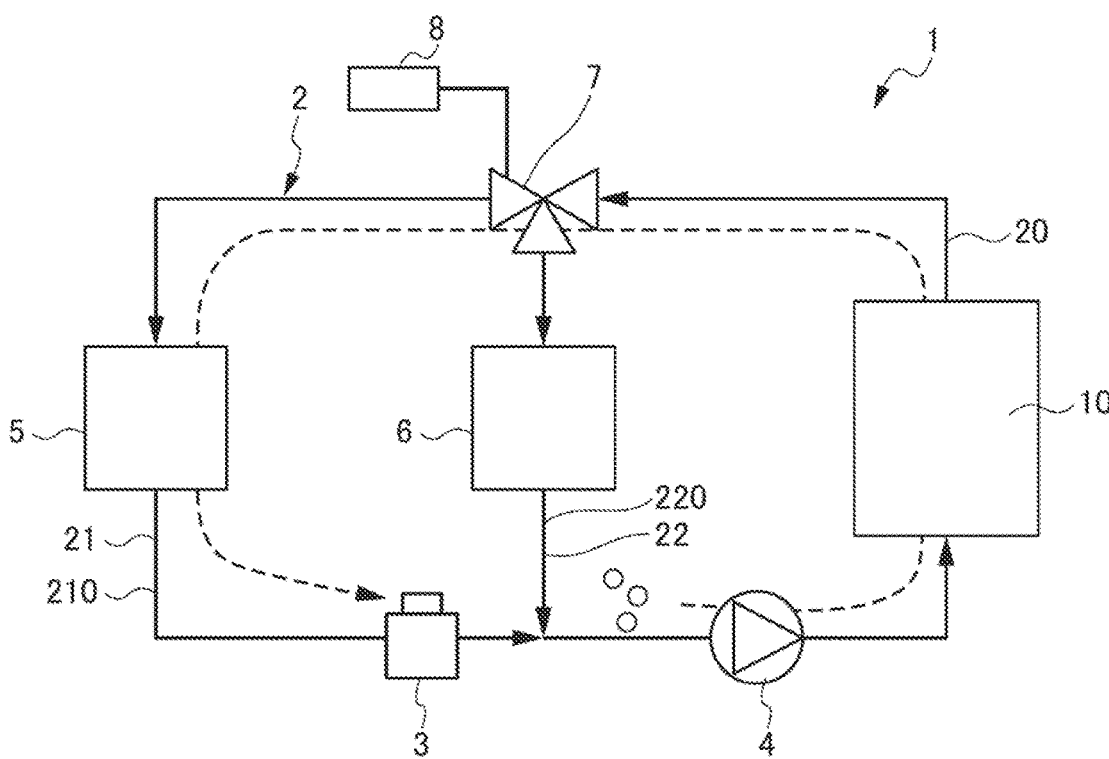
FIG. 2 is a view showing a state of closing a solenoid valve in the battery temperature regulation device according to the present embodiment.

The coolant is filled from the fill port 3. After filling, the pump 4 is run to circulate the coolant inside the circuit 2. As shown in FIG. 2, while the controller 8 is turning OFF the solenoid valve 7, the coolant cools the battery 10 by passing through the common circuit 20 from the fill port arrangement circuit 210. The time when turning OFF this solenoid valve is defined as a solenoid valve first closing time t0 as a solenoid valve closing time. The solenoid valve first closing time t0 is described later. In addition, the coolant passes through the solenoid valve 7 via the common circuit 20, and circulates so as to flow through the fill port arrangement circuit 210. While the coolant is circulating in the fill port arrangement circuit 210, the air remaining in the circuit 2 during filling is discharged from the top of the fill port 3 arranged in the fill port arrangement circuit 210.

Figure 3:
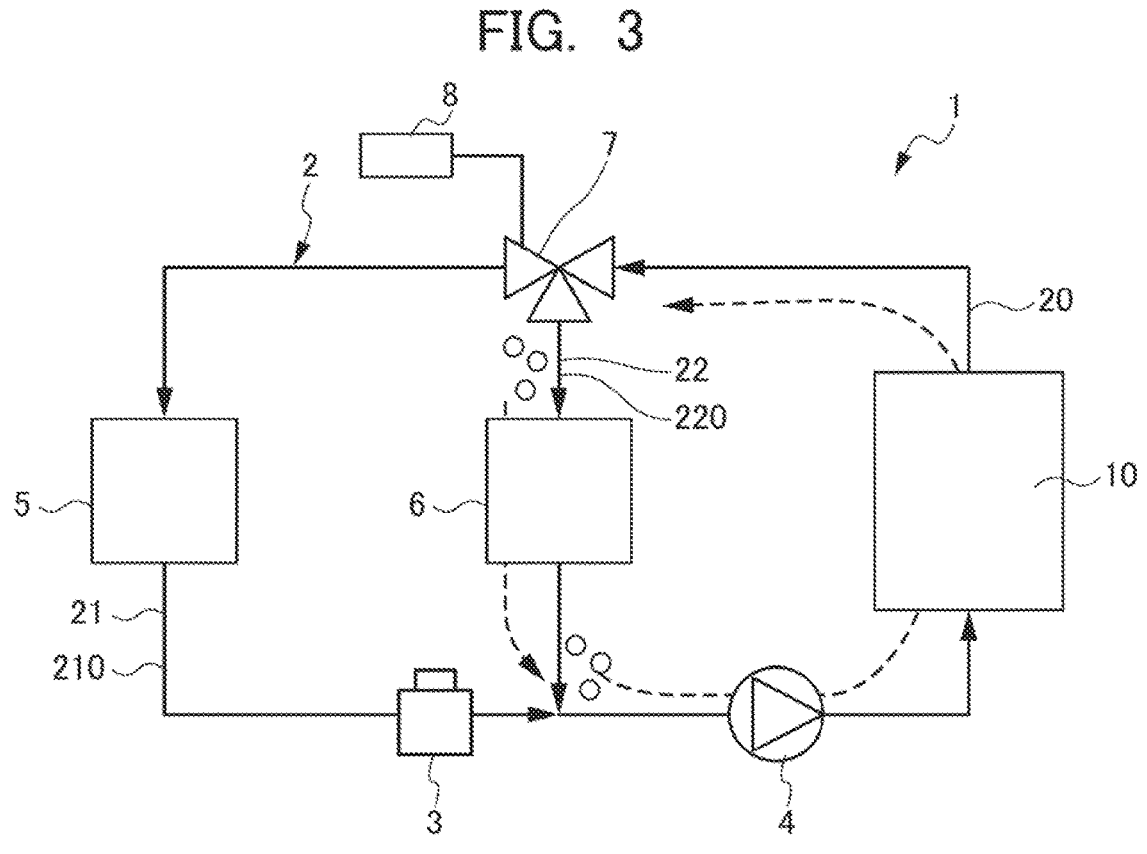
FIG. 3 is a view showing a state opening the solenoid valve in the battery temperature regulation device according to the present embodiment.

As shown in FIG. 3, the controller 8 performs open/close control so as to open the solenoid valve 7 for a predetermined time t1, after the solenoid valve first closing time t0. When the controller 8 turns ON the solenoid valve 7, the fill port arrangement circuit 210 is closed, and the fill port non-arrangement circuit 220 is opened. After the coolant in the fill port arrangement circuit 210 flows through the common circuit 20, by opening the fill port arrangement circuit 220, the flow path switches from the fill port arrangement circuit 210 to the fill port non-arrangement circuit 220. Since the coolant circulates in the common circuit 20 from the fill port non-arrangement circuit 220, the air included in the fill port non-arrangement circuit 220 migrates to the common circuit 20 together with the coolant.

The coolant passes through the fill port non-arrangement circuit 220, and after air in the fill port non-arrangement circuit 220 migrates to the common circuit 20, if the controller 8 turns OFF the solenoid valve again, the flow path will be switched to the fill port arrangement circuit 210. The time when the solenoid valve is turned OFF after the elapse of this predetermined time t1 is defined as a solenoid valve second closing time t2 as a solenoid valve closing time. The solenoid valve second closing time t2 is described later. As shown in FIG. 2, the air passing through the common circuit 20 is discharged from the water fill port 3 through the fill port arrangement circuit 210. In this way, operation of closing the solenoid valve 7 after opening for a predetermined time t1 is performed a plurality of times, and the circuit 2 circulating the coolant is switched from the fill port non-arrangement circuit 220 to the fill port arrangement circuit 220 via the common circuit 20, whereby the air remaining in the circuit 2 is discharged from the fill port 3.

Figure 4:
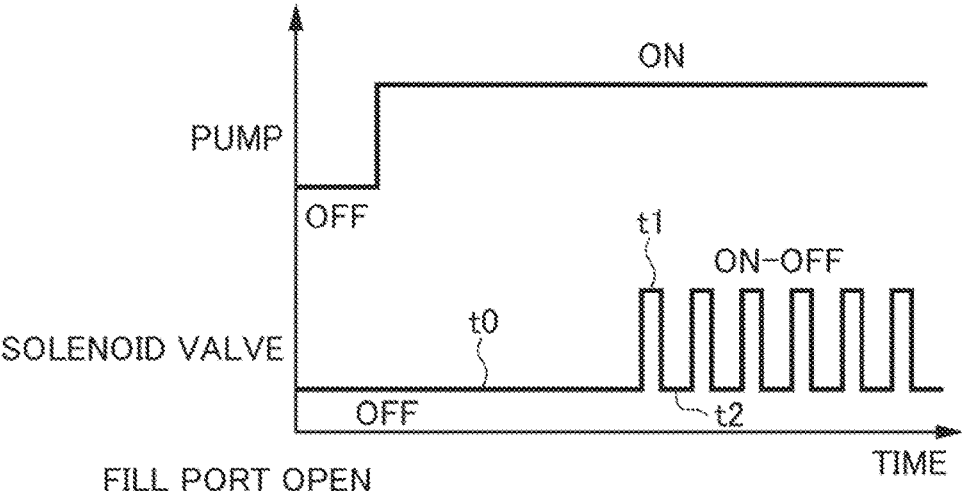
FIG. 4 is a graph for explaining open/close control of the solenoid valve in the battery temperature regulation device according to the present embodiment.
Figure 5:
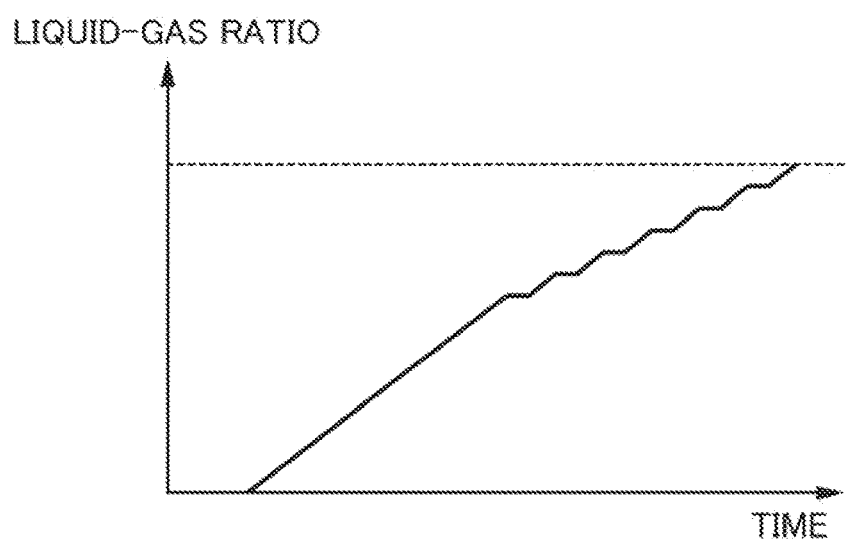
FIG. 5 is a graph showing a liquid gas ratio in the battery temperature regulation device according to the present embodiment.

As shown in FIGS. 4 and 5, when repeating the open/close control by ON and OFF of the solenoid valve 7 a plurality of times, the air remaining in the fill port non-arrangement circuit 220 is reliably discharged. In the case of the circuit 2 being long or having bending portions, it is preferably to repeat a plurality of times. As performing open/close control a plurality of times, since the air included in the coolant collects to form bubbles and is discharged, the liquid-gas ratio (water injection rate) improves.

Next, the solenoid valve first closing time t0, predetermined time t1, and solenoid valve second closing time t2 will be explained. Herein, "water amount" indicates the total amount of fluid of the coolant filling each of the circuits 2 (common circuit 20, first circuit 21 and second circuit 22), and does not mean water ($H_2O$), but rather is called the water amount for differentiating from flow rate. The flow rate (L/min) of coolant in the circuit 2 changes between a case of the water temperature being low and high. For example, in the case of the water temperature being low, the viscosity of the coolant may rise, in an environment where the air temperature is very low. The range of low temperature and range of high temperature may be set as appropriate according to the environment in which the vehicle is driving, in the range of 0 to 40 degrees including low temperature and high temperature.

The water amount of the common circuit 20 is defined as V_A, and the water amount of the fill port arrangement circuit 210 is defined as V_B, and the fill port non-arrangement circuit 220 is defined as V_C.

In addition, the flow rate in a state in which the solenoid valve 7 is opened under low temperature in each of the circuits 2 is defined as Q_on_low, the flow rate in a state in which the solenoid valve 7 is opened under high temperature is defined as Q_on_high, the flow rate in a state in which solenoid valve 7 is closed under low temperature is defined as Q_off_low, and the flow rate in a state in which the solenoid valve 7 is closed under high temperature is defined as Q_off_high.

The solenoid valve first closing time t0 has a lower limit value. The lower limit value for the solenoid valve first closing time t0 is defined as closing lower limit time t0 min. The closing lower limit time t0 min is a time of a lower limit required for moving air having migrated in the common circuit 20 to the fill port arrangement circuit 210 and sending to the fill port 3 by closing the solenoid valve 7. The closing lower limit time t0 min is obtained by dividing a value arrived at by adding the water amount (V_A) of coolant filled in the common circuit 20 and the water amount (V_B) of coolant filled in the fill port arrangement circuit 210, by the flow rate (Q_off_low) in the common circuit 20 and fill port arrangement circuit 210 in a state closing the solenoid valve 7 under low temperature (t0_min=(V_A+V_B)/Q_off_low). The solenoid valve first closing time t0 is sufficient if at least this lower limit value.

The predetermined time t1 opening the solenoid valve 7 is a time turning ON the solenoid valve 7, and is a time opening the flowpath to the fill port non-arrangement circuit 220, as shown in FIG. 4.

The predetermined time t1 has a lower limit value and an upper limit value. The lower limit value for the predetermined time t1 is defined as the opening lower limit time t1_min, and the upper limit value for the predetermined time t1 is defined as the opening upper limit time t1 max.

The opening lower limit time t1_min is the lower limit time which is the shortest needed to discharge the air remaining in the fill port non-arrangement circuit 220 to the common circuit 20. The opening lower limit time t1_min is obtained by dividing the water amount (V_C) of coolant filled in the fill port non-arrangement circuit 220 by the flow rate (Q_on_low) in the fill port non-arrangement circuit 220 when opening the solenoid valve 7 under low temperature (t1 min=V_C/Q_on_low).

The opening upper limit time t1_max is the upper limit time which is the longest leaving the solenoid valve 7 open so that the air migrating from the fill port non-arrangement circuit 220 to the common circuit 20 does not return to the fill port non-arrangement circuit 220 again. The opening upper limit time t1 max is obtained by dividing the water amount (V_A) of coolant filled in the common circuit 20 by the flow rate (Q_on_high) in the common circuit 20 when opening the solenoid valve 7 under high temperature (t1 max=V_A/Q_on_high).

The predetermined time t1 is set so as to be opening lower limit time t1_min<predetermined time t1<opening upper limit time t1_max.

The solenoid value second closing time t2 is a time the coolant having passed through the fill port non-arrangement circuit 220 after opening the solenoid valve 7 for the predetermined time t1 having passed the fill port arrangement circuit 210 via the common circuit 20 until escaping from the fill port 3. In order to explain the sequence of performing the open/close control of opening and closing the solenoid valve 7 a plurality of times, although explained by differentiating from the solenoid valve first closing time t0, the solenoid valve second closing time t2 can obtain a lower limit value similarly to the solenoid valve first closing time t0. In other words, the closing lower limit time t2 min is obtained by dividing a value arrived at by adding the water amount (V_A) of coolant filled in the common circuit 20 and the water amount (V_B) of coolant filled in the fill port arrangement circuit 210, by the fluid amount (Q_off_low) in the common circuit 20 and fill port arrangement circuit 210 in a state closing the solenoid valve 7 under low temperature (t2 min=(V_A+V_B)/Q_off_low). The solenoid valve second closing time t2 is sufficient if at least this lower limit value.

According to the present embodiment, the following effects are exerted.

(1) The battery temperature regulation device 1 for regulating the temperature of a battery by way of coolant is configured to include: the fill port 3 provided to the circuit 2 in which coolant circulates and into which coolant is filled; the pump 4 which circulates the coolant; a plurality of heat exchangers (first heat exchanger 5, second heat exchanger 6) which exchange heat with the coolant; the solenoid valve 7 arranged at a branching path of the circuit 2, and switching the flow path through which the coolant flows; the controller 8 which controls switching of the flow path by the solenoid valve 7; the common circuit 20 performing heat exchange with the battery 10; the first circuit 21 arranged switchably from the common circuit 20 by way of the solenoid valve 7 and in which the first heat exchanger 5 is provided; and the second circuit 22 arranged switchably from the common circuit 20 by way of the solenoid valve 7 and in which the second heat exchanger 6 is provided. Arranging the fill port 3 in either of the first circuit 21 and second circuit 22, in the case of filling coolant from the fill port 3, the open/close control of the solenoid valve 7 is performed after operation of the pump 4 and by switching the circuit 2 circulating the coolant to the fill port arrangement circuit 210 in which the fill port 3 is arranged among either of the first circuit 21 and second circuit 22, air remaining in the circuit 2 is discharged from the fill port 3.

It is possible to guide air remaining in the circuit 2 to a circuit 2 having the fill port 3, by switching the circuit 2 to the fill port arrangement circuit 210 by performing open/close circuit of the solenoid valve 7. Consequently, air tends to escape during filling of coolant. The degrees of freedom in layout of the fill port 3 thereby broadens, and it is possible to compactly design the circuit 2, and it becomes possible to make the battery temperature regulation device 1 compact. Furthermore, it becomes possible to fill coolant even without a vacuum filler during filling of coolant, and thus the burden on the user is reduced.

(2) According to the present embodiment, the coolant is circulated so as to flow from the fill port arrangement circuit 210 through the fill port arrangement circuit 210 through the common circuit 20. The air in the fill port arrangement circuit in which the fill port 3 is arranged is thereby reliably discharged.

(3) According to the present embodiment, the open/close control is performed, and after the coolant flows through to the common circuit 20 from the fill port arrangement circuit 210, so that the fill port non-arrangement circuit 220 in which the fill port 3 is not arranged among either of the first circuit 21 and second circuit 22 is opened, and after the coolant passes through the fill port non-arrangement circuit 220, the flow path of coolant is switched to the fill port arrangement circuit 210 to discharge air from the fill port arrangement circuit 210. The air remaining in the fill port non-arrangement circuit 220 in which the fill port 3 is not arranged also thereby flows through the fill port arrangement circuit 210 by circulating in the circuit 2, and is discharged from the fill port 3. Since it becomes possible to discharge air wherever the fill port 3 is arranged, the degree of freedom in layout of the fill port 3 broadened, and it is possible to compactly design the circuit 2. In addition, it becomes possible to make the battery temperature regulation device 1 compact. Furthermore, it becomes possible to fill coolant even without a vacuum filler during filling of coolant, and thus the burden on the user is reduced.

(4) According to the present embodiment, the open/close control is performed so as to open the solenoid valve 7 after the elapse of the solenoid valve closing time (solenoid valve first closing time t0, solenoid valve second closing time t2), and sets the solenoid valve closing time as at least a value obtained by dividing the value arrived at by adding the water amount (V_A) of coolant filled in the common circuit 20 and the water amount (V_B) of coolant filled in the fill port arrangement circuit 210, by the flow rate in the state closing the solenoid valve 7. It is thereby possible to set the solenoid valve closing time as a lower limit for the time of the water flowing in the common circuit 20 and fill port arrangement circuit 210 to the fill port 3, and the air in the fill port arrangement circuit 210 running to the fill port 3 and discharging. Consequently, it becomes possible to more accurately and efficiently perform discharge of air.

(5) According to the present embodiment, the open/close control is performed so as to open the solenoid valve 7 for a predetermined time t1, after the elapse of the solenoid valve closing time (solenoid valve first closing time t0, solenoid valve second closing time t2), and the lower limit (t1_min) of the predetermined time t1 is set to a value arrived at by dividing the water amount (V_C) of coolant filled in the fill port non-arrangement circuit 220 by the flow rate in a state opening the solenoid valve 7, and the upper limit (t1_max) of the predetermined time t1 is set to a value arranged at by dividing the water amount (V_C) of coolant filled in the common circuit 20 by the flow rate in a state opening the solenoid valve. It is thereby possible to set the time required to discharge air remaining in the fill port non-arrangement circuit 220 to the common circuit 20 as the lower limit for the predetermined time t1, and set the time so that the air discharged from the fill port non-arrangement circuit 220 does not enter the fill port non-arrangement circuit 220 again as the upper limit for the predetermined time t1. Consequently, it becomes possible to more accurately and efficiently perform discharge of air.

Figure 6:
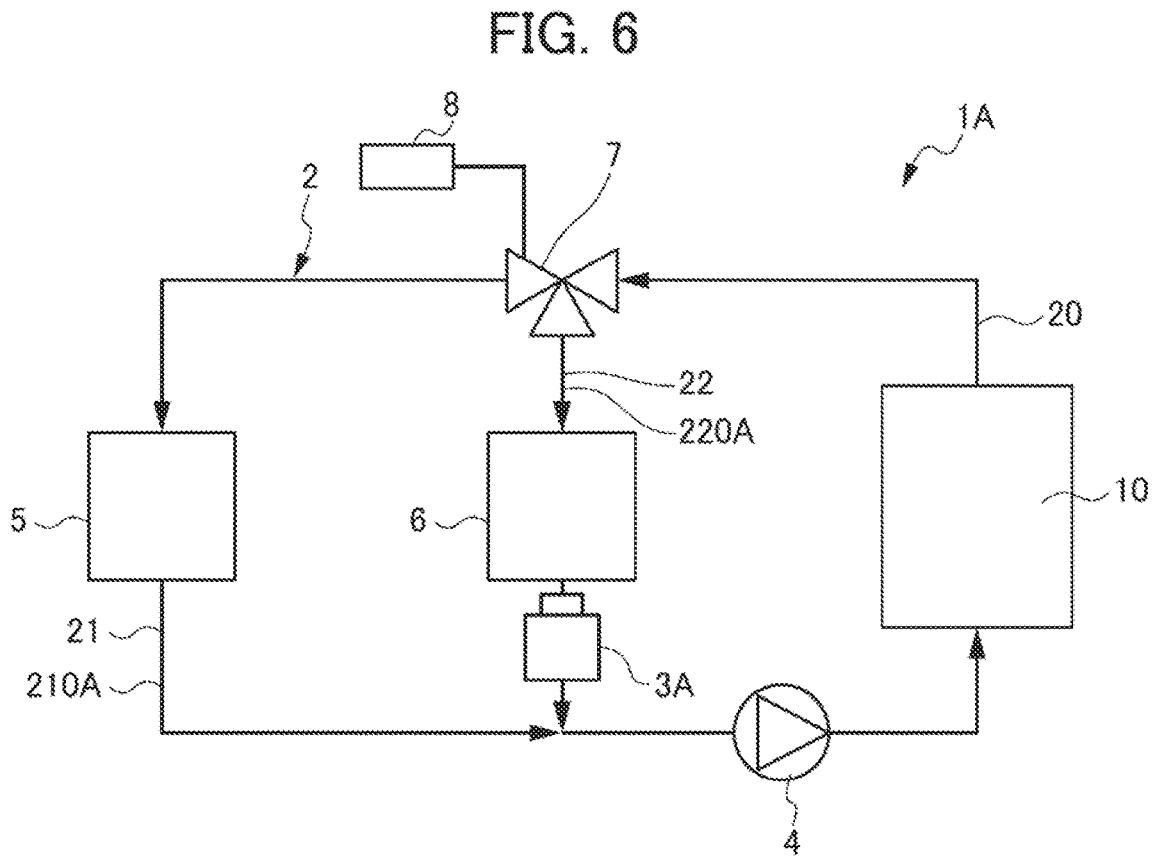
FIG. 6 is a view showing a battery temperature regulation device according to another embodiment.

It should be noted that the present invention is not to be limited to the above embodiment, and modifications, improvements, etc. of a scope which can achieve the object of the present invention are encompassed by the present invention. FIG. 6 shows a battery temperature regulation device 1A according to another embodiment. As shown in FIG. 6, a fill port 3A may be arranged in the second circuit 22 in which the second heat exchanger 6 is arranged. In this case, the second circuit 22 becomes the fill port arrangement circuit 220A, and the first circuit 21 becomes the fill port non-arrangement circuit 210A.

In the other embodiment, after discharging air from the second circuit 22 (fill port arrangement circuit 220A) in which the second heat exchanger 6 is arranged, open/close control of the solenoid valve 7 is performed for a predetermined time t1. At this time, the controller 8 operates the solenoid valve 7 so that the air flowing through the first circuit 21 (fill port non-arrangement circuit 210A) in which the first heat exchanger 5 is arranged is discharged from the second circuit 22 (fill port arrangement circuit 220A) in which the second heat exchanger 6 is arranged, after migrating to the common circuit 20. Even with this configuration, it is possible to discharge air from the fill port arrangement circuit 220A in which the second heat exchanger 6 is arranged.

In addition, when turning ON the solenoid valve 7, or when turning OFF, whether coolant flows through either of the first circuit 21 and second circuit 22 may be set and changed as appropriate. In addition, the open/close control may be started from a state opening the solenoid valve 7.

In addition, in the above explanation, the temperature is divided into cases of high temperature and low temperature as flow rates; however, it is not limited thereto. There may also be cases of setting steplessly the flow rate without considering the differences in temperature. The solenoid valve first closing time, predetermined time, solenoid valve second closing time are obtained by dividing the water amount of each circuit by the flow rate.

In addition, the solenoid valve first closing time (refer to FIG. 4) circulating coolant in the fill port arrangement circuit 210 and common circuit 20 in a state with the solenoid valve 7 is OFF may be set in advance, or a sensor may be provided in the fill port arrangement circuit 210 to detect whether or not the air in the fill port arrangement circuit 210 has escaped by way of the sensor.

EXPLANATION OF REFERENCE NUMERALS

1 battery temperature regulation device
2 circuit
3 fill port
4 pump
5 first heat exchanger
6 second heat exchanger
7 solenoid valve
8 controller
20 common circuit (heat exchange circuit)
21 first circuit
22 second circuit
210, 220A fill port arrangement circuit
220, 210A fill port non-arrangement circuit

What is claimed is:

1. A battery temperature regulation device for regulating temperature of a battery by way of a coolant, comprising:
   a fill port provided in a circuit in which coolant circulates, and to which the coolant is filled;
   a pump for circulating the coolant;
   a plurality of heat exchangers which exchange heat with the coolant;
   a solenoid valve disposed at a branching path of the circuit and switching a flowpath through which the coolant flows;
   a controller which controls switching of the flowpath by the solenoid valve;
   a heat exchange circuit which performs heat exchange with the battery;
   a first circuit disposed switchably from the heat exchange circuit by the solenoid valve, and in which a first heat exchanger is provided; and
   a second circuit disposed switchably from the heat exchange circuit by the solenoid valve, and in which a second heat exchanger is provided, wherein the fill port is disposed in either of the first circuit and the second circuit, each configures a part of the circuit, and
   wherein, in a case of filling coolant from the fill port,
   open/close control of the solenoid valve is performed after operation of the pump, and
   by switching the circuit circulating coolant to a fill port arrangement circuit in which the fill port is arranged among either of the first circuit and the second circuit, air remaining in the circuit is discharged from the fill port,
   wherein the open/close control includes opening a fill port non-arrangement circuit in which the fill port is not arranged among either of the first circuit and the second circuit, after coolant has flowed from the fill port arrangement circuit to the heat exchange circuit, and switching the flow path of coolant to the fill port arrangement circuit after coolant passes through the fill port non-arrangement circuit to discharge air from the fill port arrangement circuit,
   wherein the open/close control is performed so as to open the solenoid valve after a solenoid valve closing time elapses, and
   wherein the solenoid valve closing time is established as at a least a value obtained by dividing a value arrived at by adding a water amount of coolant filled in the heat exchange circuit and a water amount of coolant filled in the fill port arrangement circuit by a flow rate in a state closing the solenoid valve.

2. The battery temperature regulation device according to claim 1, wherein
   the coolant circulates from the fill port arrangement circuit through the heat exchange circuit to flow through the fill port arrangement circuit.

3. The battery temperature regulation device according to claim 1, wherein
   the open/close control is performed so as to open the solenoid valve for a predetermined time after the solenoid valve closing time has elapsed,
   wherein a lower limit for the predetermined time is established as a value obtained by dividing a water amount of coolant filled in the fill port non-arrangement circuit by a flow rate in a state opening the solenoid valve, and
   wherein an upper limit for the predetermined time is established as a value obtained by dividing a water amount of coolant filled in the heat exchange circuit by a flow rate in a state opening the solenoid valve.

4. A battery temperature regulation device for regulating temperature of a battery by way of a coolant, comprising:
   a fill port provided in a circuit in which coolant circulates, and to which the coolant is filled;
   a pump for circulating the coolant;
   a plurality of heat exchangers which exchange heat with the coolant;
   a solenoid valve disposed at a branching path of the circuit and switching a flowpath through which the coolant flows;
   a controller which controls switching of the flowpath by the solenoid valve;
   a heat exchange circuit which performs heat exchange with the battery;
   a first circuit disposed switchably from the heat exchange circuit by the solenoid valve, and in which a first heat exchanger is provided; and a second circuit disposed switchably from the heat exchange circuit by the solenoid valve, and in which a second heat exchanger is provided, wherein the fill port is disposed in either of the first circuit and the second circuit, each configures a part of the circuit, and wherein, in a case of filling coolant from the fill port, open/close control of the solenoid valve is performed after operation of the pump, and by switching the circuit circulating coolant to a fill port arrangement circuit in which the fill port is arranged among either of the first circuit and the second circuit, air remaining in the circuit is discharged from the fill port, wherein the open/close control includes opening a fill port non-arrangement circuit in which the fill port is not arranged among either of the first circuit and the second circuit, after coolant has flowed from the fill port arrangement circuit to the heat exchange circuit, and switching the flow path of coolant to the fill port arrangement circuit after coolant passes through the fill port non-arrangement circuit to discharge air from the fill port arrangement circuit, wherein the open/close control is performed so as to open the solenoid valve after a solenoid valve closing time elapses, and wherein the solenoid valve closing time is established as at a least a value obtained by dividing a value arrived at by adding a water amount of coolant filled in the heat exchange circuit and a water amount of coolant filled in the fill port arrangement circuit by a flow rate in a state closing the solenoid valve, wherein the open/close control is performed so as to open the solenoid valve for a predetermined time after the solenoid valve closing time has elapsed, wherein a lower limit for the predetermined time is established as a value obtained by dividing a water amount of coolant filled in the fill port non-arrangement circuit by a flow rate in a state opening the solenoid valve, and wherein an upper limit for the predetermined time is established as a value obtained by dividing a water amount of coolant filled in the heat exchange circuit by a flow rate in a state opening the solenoid valve.

* * * * *